(12) United States Patent
Westendorf

(10) Patent No.: US 10,842,130 B2
(45) Date of Patent: Nov. 24, 2020

(54) INFRASTRUCTURE ARRANGEMENT FOR A FARM ANIMAL SHED AND METHOD FOR PROVIDING SAME

(71) Applicant: BIG DUTCHMAN INTERNATIONAL GMBH, Vechta (DE)

(72) Inventor: Dirk Westendorf, Lohne (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 0 days.

(21) Appl. No.: 16/624,558

(22) PCT Filed: Jun. 20, 2018

(86) PCT No.: PCT/EP2018/066395
§ 371 (c)(1),
(2) Date: Dec. 19, 2019

(87) PCT Pub. No.: WO2018/234374
PCT Pub. Date: Dec. 27, 2018

(65) Prior Publication Data
US 2020/0214263 A1  Jul. 9, 2020

(30) Foreign Application Priority Data
Jun. 20, 2017  (DE) .................... 20 2017 103 642 U

(51) Int. Cl.
*A01K 29/00* (2006.01)
*A01K 1/015* (2006.01)
(Continued)

(52) U.S. Cl.
CPC ................ *A01K 29/00* (2013.01); *A01K 1/01* (2013.01); *A01K 1/015* (2013.01); *A01K 5/0266* (2013.01);
(Continued)

(58) Field of Classification Search
None
See application file for complete search history.

(56) References Cited

U.S. PATENT DOCUMENTS

| 8,397,670 B2 * | 3/2013 | Van Den Berg ...... G01S 7/4802 |
| | | 119/14.11 |
| 2002/0049522 A1 | 4/2002 | Ruffner |
| 2015/0250137 A1 | 9/2015 | Palsgaard |

FOREIGN PATENT DOCUMENTS

DE    60015478       10/2005
EP     3023004 A1     5/2016
(Continued)

*Primary Examiner* — K. Wong
(74) *Attorney, Agent, or Firm* — Price Heneveld LLP

(57) ABSTRACT

An infrastructure arrangement and method for a farm animal shed includes a stationary position determination network having multiple optics-free position determination network points and at least one autonomous shed vehicle. The autonomous shed vehicle has a drive and a charging interface for the drive, an optics-free position determination apparatus, a coupling apparatus for detachably securing various functional units, and a control unit. The infrastructure arrangement and method also includes at least one charging station for charging the drive of the autonomous shed vehicle, at least one fitting station for fitting the autonomous shed vehicle with various functional units and/or work materials, and at least one data transmission unit, wherein the control unit of the autonomous shed vehicle is designed to take information of the position determination apparatus and of the data transmission unit as a basis for generating a schedule for the autonomous shed vehicle.

19 Claims, 7 Drawing Sheets

(51) Int. Cl.
  *A01K 1/01* (2006.01)
  *A01K 5/02* (2006.01)
  *A01K 39/01* (2006.01)
  *B60P 3/04* (2006.01)
  *G05D 1/02* (2020.01)

(52) U.S. Cl.
  CPC ............ *A01K 5/0291* (2013.01); *A01K 39/01* (2013.01); *B60P 3/04* (2013.01); *G05D 1/027* (2013.01); *G05D 1/0257* (2013.01); *G05D 1/0272* (2013.01)

(56) References Cited

FOREIGN PATENT DOCUMENTS

| | | |
|---|---|---|
| GB | 2529166 | 2/2016 |
| WO | 2008118004 A1 | 10/2008 |

\* cited by examiner

INFRASTRUCTURE ARRANGEMENT FOR A FARM ANIMAL SHED AND METHOD FOR PROVIDING SAME

CROSS-REFERENCE TO FOREIGN PRIORITY APPLICATION

The present application claims the benefit under 35 U.S.C. §§ 119(b), 119(e), 120, and/or 365(c) of PCT/EP2018/0066395 filed Jun. 20, 2018, which claims priority to German utility model application DE 20 2017 103 642.1, filed on Jun. 20, 2017, the entire disclosure of said document being incorporated herein by way of reference.

FIELD OF THE INVENTION

The invention relates to an infrastructure arrangement for a farm animal shed and to a method for providing infrastructure for a farm animal shed.

BACKGROUND OF THE INVENTION

Infrastructure arrangements for farm animal sheds and methods for providing infrastructure in farm animal sheds are known and also comprise autonomous shed vehicles, for example.

SUMMARY OF THE INVENTION

It is, therefore, an object of the present invention to provide an improved infrastructure arrangement for a farm animal shed and an improved method for providing infrastructure for a farm animal shed. In particular, it is an object of the present invention to provide an infrastructure arrangement for a farm animal shed and a method for providing infrastructure for a farm animal shed that increase the animal welfare and/or the efficiency of farm animal husbandry.

This object is achieved according to the invention by an infrastructure arrangement for a farm animal shed, said infrastructure arrangement comprising a stationary position determination network having multiple optics-free position determination network points, at least one autonomous shed vehicle, wherein the autonomous shed vehicle has a drive and a charging interface for the drive, an optics-free position determination apparatus, a coupling apparatus for detachably securing various functional units, and a control unit, at least one charging station for charging the drive of the autonomous shed vehicle, at least one fitting station for fitting the autonomous shed vehicle with various functional units and/or work materials, and at least one data transmission unit, wherein the control unit of the autonomous shed vehicle is designed to take information of the position determination apparatus and of the data transmission unit as a basis for generating a schedule for the autonomous shed vehicle.

The infrastructure arrangement described in the present case has an autonomous shed vehicle having a control unit. The autonomous shed vehicle further has an optics-free position determination apparatus. An optics-free position determination apparatus can also be referred to as a flare. The infrastructure arrangement further comprises a stationary position determination network having a multiple optics-free position determination network points. These may be arranged in the farm animal shed, preferably in physically distributed fashion, when the infrastructure arrangement is arranged in a farm animal shed so as to be ready for operation. The control unit of the autonomous shed vehicle is designed to take information of the position determination apparatus and of a data transmission unit of the infrastructure arrangement as a basis for generating a schedule for the autonomous vehicle.

The position determination by means of the position determination apparatus of the autonomous shed vehicle and of the stationary position determination network is preferably effected in optics-free fashion. Optics-free is understood in the present case as in particular position determination that is not based on an optical method, that is to say, provides for no image recognition, light barriers, or the like, for example. Optics-free is also understood in the present case to mean in particular position determination that operates without optical elements, in particular without lenses and/or light.

The autonomous shed vehicle can preferably have two, three, or more optics-free position determination apparatuses. In this manner, an orientation and/or a vector of the shed vehicle can be ascertained even without movement by the shed vehicle, that is to say, at a standstill.

Optics-free position determination can preferably be effected by means of a flare network. Optics-free position determination can comprise position determination for which a direct line of sight exists between the position determination apparatus of the autonomous shed vehicle and one or more optics-free position determination network points, said direct line of sight not being impaired by shed fixtures, for example. A direct line of sight of this kind between the position determination apparatus of the autonomous shed vehicle and one or more of the position determination network points of the position determination network may also be preferred for optics-free position determination.

Preferably, position determination network points are arranged such that there is a direct line of sight between the position determination apparatus of the autonomous shed vehicle and at least one, preferably two, three, four, or five, of the position determination network points of the position determination network, regardless of where the shed vehicle is in the shed.

The autonomous shed vehicle further has a charging interface in order to be able to charge the drive at a charging station of the infrastructure arrangement.

Further, the autonomous shed vehicle has a coupling apparatus for detachably securing various functional units. By way of example, it is fundamentally possible for a functional unit to be arranged on the coupling apparatus, but for said functional unit to be removed and replaced by another functional unit. Preferably, the autonomous shed vehicle can be operated with or without a functional unit, in particular, even with changing functional units.

The detachable securing of a functional unit to the coupling apparatus can also be referred to as fitting. For this purpose, the infrastructure arrangement has at least one fitting station in which the autonomous shed vehicle can be coupled to a functional unit and/or in which the autonomous shed vehicle can be fitted with work materials.

The data transmission unit of the infrastructure arrangement is preferably designed for a data interchange with the autonomous shed vehicle, in particular, the control unit thereof, and/or with a central computer. By way of example, the data transmission unit can be used to send information pertaining to work orders to be performed by the autonomous shed vehicle from a central computer to the control unit of the autonomous shed vehicle. More preferably, information about work orders performed can be conveyed from a control unit of the autonomous shed vehicle to a central computer via the data transmission unit.

In the control unit of the autonomous shed vehicle, preferably information from the position determination apparatus about the current position of the autonomous shed vehicle and information from the data transmission unit, for example, pertaining to scheduled work orders for the autonomous shed vehicle, can be combined, so that a schedule for the autonomous shed vehicle can be generated. A schedule for the autonomous shed vehicle can preferably comprise a scheduled route and/or work to be performed at specific positions and/or work material to be picked up and/or put out and/or functional units to be used, etc.

In this manner, the infrastructure arrangement described herein allows largely autonomous scheduling for the autonomous shed vehicle. By way of example, an operator of a farm animal shed can generate work orders to be performed on a central computer and can convey them to the autonomous shed vehicle via the data transmission unit. In the control unit of the autonomous shed vehicle, the combination with current position data from the autonomous shed vehicle can be used to generate a schedule that allows the current position of the shed vehicle to be taken as a basis for processing the pending work orders as efficiently as possible. To this end, the control unit preferably stores suitable scheduling algorithms. Preferably, synchronization of data and information to a central computer and/or a network is also possible.

This is suitable, in particular, for recurring tasks in a farm animal shed that can be performed by the autonomous shed vehicle in substantially automated fashion. For this, different work tasks may require different properties, such as, for example, ballasting, and/or specific functional units, for example, in the form of tools, and/or changing work materials, for example, consumables. The fitting station and/or the autonomous shed vehicle are in this case preferably designed such that the autonomous shed vehicle is fitted with various functional units and/or work materials autonomously and/or in automated fashion, there preferably being no need for action by a user at the fitting station. Preferably, the action by a user is restricted to the prescribing of a work order, for example, from a central computer and/or via a human-machine interface, for example, of the control unit of the autonomous shed vehicle. Preferably, the schedule generated by the control unit of the autonomous shed vehicle contains the information regarding what consumable units and/or work materials are needed, so that these can be picked up by the autonomous shed vehicle at the fitting station in automated fashion and/or autonomously.

The control unit of the autonomous shed vehicle may be designed to be on the autonomous shed vehicle itself or else may be arranged at a distance therefrom. By way of example, all or part of the control unit of the autonomous shed vehicle may be arranged in the data transmission unit and/or in a central computer.

According to a preferred embodiment, there is provision for the optics-free position determination apparatus to be designed to communicate with the position determination network to determine a position of the autonomous shed vehicle inside the farm animal shed.

The optics-free position determination apparatus is preferably designed to interact with the stationary position determination network, in particular, the position determination network points thereof, in order to determine a position of the autonomous shed vehicle. Since the autonomous shed vehicle is mobile inside the farm animal shed by means of a drive, position determination of the shed vehicle is advantageous, in particular, for example, for navigation and/or for task planning.

It is furthermore preferred for the position determination apparatus and/or at least one of the position determination network points and/or the position determination network to have an ultrawideband unit and/or an RFID unit and/or radio unit and/or an odometer and/or an inertial sensor system and/or a radar sensor system.

In a preferred embodiment, there is provision for a distance in the vertical direction between at least one of the position determination network points and/or multiple or all position determination network points and/or the position determination network and the optics-free position determination apparatus of the autonomous shed vehicle to be less than ten times an extent in the vertical direction of the autonomous shed vehicle, in particular, five times an extent in the vertical direction of the autonomous shed vehicle, and/or to be less than 3 m, in particular, less than 1.5 m.

One or more of these different optics-free position determinations are preferred, since the navigation inside a farm animal shed is normally a great challenge, firstly on account of the high particulate levels inside a farm animal shed, which normally preclude or at least significantly hamper optics-based position determinations, or on account of the shed fixtures, such as, for example, steel gratings of aviaries for poultry. These normally shield a multiplicity of frequency ranges, including standard frequency ranges for GPS (approximately 1.2 GHz or 1.5 GHz), WLAN (2.4 to 2.5 GHz), etc.). Extensive availability of a position determination network in the shed is, therefore, difficult.

Ultrawideband (UWB) technology, in particular, at a frequency between 3 and 11 GHz, in particular, between 3.1 and 10.6 GHz, has been found to be particularly suitable for a position determination in a farm animal shed.

An extent in the vertical direction of the autonomous shed vehicle is preferably of such proportions that the autonomous shed vehicle is shorter than a clear height beneath shed fixtures. In particular, there is provision for an extent in the vertical direction of the autonomous shed vehicle to be less than 450 mm, and/or less than 400 mm, and/or less than 350 mm, and/or less than 300 mm, and/or less than 250 mm, and/or less than 200 mm.

The position determination network points of the position determination network are preferably arranged above a head height of the farm animals and/or below a ceiling of a farm animal shed. Preferably, the position determination network points are on one or two, preferably horizontal, levels in a vertical direction. In this manner, shadowing effects can be minimized and, further, the number of position determination network points required can be reduced. More preferably, the position determination network points are arranged at most at the height of an upper end of the shed fixtures, in particular, of poultry aviaries, in a vertical direction. In particular, it is preferred for the position determination network points to be at a downward distance, of at least 1 m, from a farm animal shed ceiling and/or an upper end of the farm animal shed walls in the vertical direction. Particularly preferably, the position determination network points are arranged at most at the level of a lower animal residence area of the shed fixtures, in particular, at most at the level of a lower animal residence floor of a poultry aviary, in the vertical direction. It is particularly preferred for the position determination network points to be arranged at most at the level of a lower residence tier of the shed fixtures and above a farm animal height in the vertical direction, the farm animal height preferably being the height that the farm animals located on the shed floor do not exceed as a rule when behaving normally, that is to say, for example, the head height of poultry.

These configurations are preferred for poultry, in particular, in farm animal sheds.

Further, it is preferred for the autonomous shed vehicle, in particular, the control unit, to have a, preferably electronic, map of the farm animal shed and/or of surroundings of the farm animal shed, for example, of a whole farm animal shed installation. The accuracy of this map can preferably be produced and/or increased during operation and/or on startup. In particular, the map can serve as a basic premise or input information and can preferably be validated and/or improved during operation, in particular, while the shed vehicle is traveling. This can be done, for example, by virtue of the shed vehicle detecting obstacles, recording them, and comparing them against the map. A validation function of this kind, which is preferably combined with obstacle detection and/or collision detection, results in various advantages and functions. The preferably electronic map can be validated and/or improved on startup and/or also as what is known as a plug and play solution directly in the farm animal shed in situ.

By way of example, a user can put out manipulable material for the farm animals. Alternatively, the autonomous shed vehicle can also put out manipulable material for the animals, for example, by virtue of an appropriate work order having been conveyed to the shed vehicle for that purpose. After the manipulable material is put out, it is usually in the corridors of a farm animal shed. The user can note the position at which the manipulable material has been put out on the map, so that this is recorded as a temporary obstacle and the autonomous shed vehicle can bypass these areas with the manipulable material put out as appropriate, in particular, over a prescribed period of time in which the manipulable material is usually depleted and/or stripped down. This allows the obstacles to be bypassed, which can lead to a significant time saving in comparison with known systems in which a shed vehicle travels through an area and, on every crossing, travels to the obstacle again and has to make a bypass, for example, according to provided bypass patterns.

The recording of manipulable material or the like that has been put out on the map by a user can be rated as a work order for the autonomous shed vehicle. By way of example, a user can note on a map the position at which the autonomous shed vehicle is supposed to put out the manipulable material in automated fashion.

Further, it may be preferred for a user to have the opportunity to specify an expiry date for an obstacle after which the (temporary) obstacle will probably no longer exist, for example, as result of manipulable material being depleted and/or stripped down by the farm animals.

The putting out of manipulable material has been used here as an example to illustrate functions and preferred embodiments. The features described here apply in equal measure to other functions and embodiments too, however.

Further, it is preferred for the infrastructure arrangement to be designed to generate, preferably regularly, reports with notifications pertaining to the farm animal shed, for example, with a report about obstacles, in which a user can then assign an appropriate expiry date. Preferably, an applicable classification of obstacles can also be provided in situ in the farm animal shed by virtue of the user carrying a mobile terminal, for example, a smartphone, that displays a map with noted positions of the obstacles and that a user can use to directly store further information, such as, for example, expiry dates, pertaining to these obstacles. Such reports can serve as a visual synopsis, for example, and can provide a user, in particular regularly, with feedback about the state of the farm animal shed.

Further, it may be preferred to be able to store status changes pertaining to obstacles, in particular pertaining to whether an obstacle is temporary, stationary, or more or less stationary. Preferably, this can be stored by a user and/or stored according to an algorithm and/or a heuristic in the autonomous shed vehicle.

Further, it may be preferred to provide areas on the preferably electronic map with a specific classification, for example as an obstacle, hotspot, or no-go area. In this manner, a user can preferably control which areas of the farm animal shed are supposed to be preferred, contained or excluded in the schedule to be generated by the control unit. Preferably, these classifications can also be edited by a user by means of a mobile terminal in situ in the farm animal shed.

An obstacle can be classified, for example, according to time, expiry date, size, and/or position. By way of example, a user can assign a specific problem to a specific position, such as, for example, hard litter, and can mark this on the electronic map using the mobile terminal and generate a work order therefor. Preferably, the autonomous shed vehicle will take this work order received via the data transmission unit and its current position as a basis for generating a schedule that initially provides for a litter till to be picked up at the fitting station and subsequently contains tilling of the hard litter at the marked position.

Preferably, a schedule generated by the control unit of the autonomous shed vehicle is alterable and/or extendable by a user, in particular, also in relation to a specific problem. By way of example, a user can provide for repeated tilling at different times in the example described in the present case.

Further, the control unit is preferably designed to generate a statistical evaluation about the success of work orders and/or proposals for the optimization thereof. Preferably, a statistical evaluation of this kind can be displayed and/or processed further on a mobile terminal, at the station in the farm animal shed, on a central computer and/or in a network, in particular, in order to be combined with further external data, for example, in order to generate automatic recommendations for specific problems, for example.

A preferred development is distinguished in that the drive is a substantially emission-free drive, in particular, an electric drive.

A further preferred development is characterized by at least one ballasting station for arranging additional weights on the autonomous shed vehicle.

The arrangement of additional weights, which can also be referred to as ballasting, may be preferred, in particular, for specific tasks and/or specific fields of use of the autonomous shed vehicle. Just like the fitting, the ballasting preferably takes place in substantially automated fashion on the basis of information from the position determination apparatus and, in particular, the data transmission unit. Details described in the present case pertaining to the automated fitting therefore accordingly also apply, mutatis mutandis, to the preferably automatic ballasting.

According to one preferred embodiment, there is provision for the schedule to comprise a sequence and/or a length of stay for traveling to and/or staying at work areas.

In a further preferred embodiment, there is provision for the data transmission unit to comprise a human-machine interface and/or a data interface that is designed to obtain information about tasks to be performed by the autonomous shed vehicle and/or to convey information about tasks performed by the autonomous shed vehicle.

A further preferred development is distinguished in that the data transmission unit and the control unit of the autonomous shed vehicle are designed for contact-based and/or line-based exchange of information with one another.

The data transmission unit and the control unit of the autonomous shed vehicle may be designed for non-contact-based and/or non-line-based exchange of information with one another.

In particular, however, the design for contact-based and/or line-based exchange of information between the data transmission unit and the control unit of the autonomous shed vehicle is preferred. Preferably, the exchange of information between the data transmission unit and the control unit of the autonomous shed vehicle can take place at one of the described stations if the autonomous shed vehicle stops at such a station.

A contact-based and/or line-based exchange of information contributes to reducing a burden on the farm animals as a result of wireless data transmission. In particular, a low transmission power of transmitters in the farm animal shed is preferred in order to keep a corresponding burden on the farm animals as low as possible.

By way of example, the autonomous shed vehicle may be substantially offline during the processing of a schedule and can process work orders and collect information. As soon as the autonomous shed vehicle is then at one of the stations described in the present case, which has a data transmission unit and/or a data interface, the autonomous shed vehicle can exchange information with the data transmission unit in contact-based and/or line-based fashion and, by way of example, can download new work orders and/or upload collected information and load it/them into a central database, for example, and/or compare it/them against setpoint data, or the like. Preferably, software updates for the autonomous shed vehicle can also be performed in this manner.

Further, there is preferably provision for the control unit of the autonomous shed vehicle to be designed to receive a callback order from the data transmission unit in non-contact-based and/or non-line-based fashion and/or to convey position and/or status information to the data transmission unit in non-contact-based and/or non-line-based fashion. Further, there is preferably provision for the autonomous shed vehicle, in particular, the position determination apparatus and/or the control unit of the autonomous shed vehicle, to be designed to receive a callback order from the position determination network in non-contact-based and/or non-line-based fashion.

This configuration is, in particular, preferred in order to be able to bring about a premature interruption to a schedule of the autonomous shed vehicle by virtue of the shed vehicle being able to be called back, for example, to one of the stations described in the present case or to another, preferably predetermined, position.

In particular, if the exchange of information between the data transmission unit and the control unit of the autonomous shed vehicle is possible only in contact-based and/or line-based fashion, the non-contact-based and/or non-line-based transmission of a callback order and/or of position information and/or of status information allows minimal communication with the autonomous shed vehicle. In this manner, it is possible to establish, for example, where the shed vehicle is and/or in what state for example the drive is, in particular, in terms of the state of charge.

Preferably, communication between the position determination apparatus and the position determination network is possible independently of contact-based and/or non-contact-based communication between the data transmission unit and the control unit.

Preferably, it is possible to locate the autonomous shed vehicle without actively sending its own position. By way of example, this can be done by sending "ping" via a flare network, for example, via the position determination apparatus and/or the position determination network. In this manner, it is possible to dispense with setting up an additional radio system for locating the autonomous shed vehicle. By transmitting a callback order via the position determination network, this callback of the shed vehicle can advantageously take place independently of data communication too.

Contact-based and/or line-based communication between the data transmission unit and the control unit is also preferred, since, in particular, most shed fixtures made from metal and/or most shed walls, which likewise contain metal, hamper the put out of contact-based and/or non-line-based communication between the data transmission unit and the control unit and make it costly, if it is realizable extensively in the farm animal shed in the first place.

In a further configuration, it is, in particular, preferred for the control unit to be designed to have the autonomous shed vehicle follow a user at a distance.

It is further preferred for the autonomous shed vehicle to comprise a tray apparatus for holding items to be transported.

The callback function can, by way of example, also be used if a user needs the autonomous shed vehicle to follow the user as distance, that is to say, to perform a "butler function." Preferably, the control unit is designed to interrupt a schedule of the autonomous shed vehicle for such a butler function and to resume it again after the butler function has ended. In the butler function, the autonomous shed vehicle can follow the user and in so doing preferably use its tray apparatus to transport items, such as, for example, a tool needed by the user, spare parts, feed, work materials, etc.

This allows the problem to be addressed that there is frequently a lack of technically competent personnel and/or the work involvement for small tasks commits a lot of personnel and/or heavy loads can usually be transported only using devices such as loaders and/or wheelbarrows. In the butler function, the autonomous shed vehicle, therefore, provides a user with a mobile tray surface and/or a mobile service trolley and/or a convenient load transport.

In order to have the autonomous shed vehicle follow a user, it is possible for image evaluation and/or field strength measurement and/or RFID technology and/or NFC technology to be used, for example, in particular, also in connection with a mobile terminal to be carried by the user, for example.

In a preferred embodiment, there is provision for at least one lock for arrangement between two or more farm animal residence areas, wherein the lock is designed for passage of the autonomous shed vehicle.

One preferred development is distinguished in that the at least one lock comprises a lift unit for moving the autonomous shed vehicle in the vertical direction, and/or comprises a cleaning apparatus for cleaning and/or disinfecting the autonomous shed vehicle or parts thereof, and/or comprises a charging station for charging the drive of the autonomous shed vehicle, and/or comprises a data interface for coupling to the data transmission unit.

A further preferred development is characterized in that the at least lock comprises a transit obstacle for farm animals.

There is frequently provision in a farm animal shed for two or more farm animal residence areas. These may be completely separate from one another, so that farm animals cannot change to and fro between the areas. Alternatively, the farm animal residence areas can also permit individual farm animals to be changed. Preferably, there is provision for a lock that can be arranged between two or more farm animal residence areas and permits the passage of the autonomous shed vehicle. This lock can comprise one or more transit obstacles for farm animals, in order to block and/or reduce passage for farm animals. Such a transit obstacle can be a slatted curtain and/or a cattle grid, for example. A cattle grid can preferably be designed as a grid comprising grid elements arranged in parallel, such as, for example bars and/or tubes and/or rails, the grid elements preferably being able to be made from metal or to comprise metal. Between the grid elements, there is preferably provision for gaps of such magnitude that the farm animals cannot enter and/or cross the cattle grid, whereas a user and/or the autonomous shed vehicle are able to enter and/or cross the cattle grid.

The two or more farm animal residence areas may be arranged on one level in a farm animal shed and/or may be distributed over different levels, in particular, tiers/floors of a shed building. The two or more farm animal residence areas can also be in different buildings of a farm animal shed installation. Between the shed buildings of a farm animal shed installation, there can also be external farm animal residence areas. Further, there may be provision, by way of example, for one or more areas to be identified as shed vehicle areas in which preferably only the shed vehicle resides.

Further, it is preferred for the position of locks also to be recorded in the preferably electronic map.

Preferably, the lock and/or the transit obstacle is in a form such that only the autonomous shed vehicle can use the lock to change between the farm animal residence areas.

In particular, if the two or more farm animal residence areas are on multiple levels above one another, it is preferred for the lock to comprise a lift unit for moving the autonomous shed vehicle in the vertical direction. The lift unit may be in the form of an elevator and/or paternoster, for example. The lock may be in the form of a light lock, for example, by means of lasers, and/or in the form of a water lock, for example.

Overall, it is preferred for the lock to comprise additional functions. By way of example, there may be provision for a cleaning apparatus that cleans and/or disinfects all or some of the autonomous shed vehicle, this being preferred, in particular, in order not to transfer dirt and/or germs etc. between farm animal residence areas. In this manner, it is also possible for biosafety internally and externally and/or hygiene to be increased.

Further, there may be provision for a charging station on the lock in order to use the time for which the autonomous shed vehicle stays in the lock to charge the drive.

Further, it is preferred for there to be provision for a data interface for coupling to the data transmission unit on the lock, so that the time for which the autonomous shed vehicle stays in the lock can also be used for data transmission.

In an advantageous manner, it is possible for the autonomous shed vehicle to be changed between different farm animal residence areas so safely that an autonomous shed vehicle can preferably serve multiple farm animal residence areas. By way of example, an autonomous farm vehicle may also be responsible for an entire farm animal shed installation. It may also be preferred for multiple, for example, differently designed, autonomous shed vehicles to be responsible for multiple farm animal residence areas.

According to one preferred embodiment, there is provision for the at least one charging station and/or the at least one fitting station and/or the at least one ballasting station and/or the at least one lock to be arranged at a higher level than a floor of an animal residence area and/or to be arranged entirely or partly in an area shielded from farm animals.

In a further preferred embodiment, there is provision for the at least one charging station and/or the at least one fitting station and/or the at least one ballasting station and/or the at least one lock to be arranged at variable levels and/or to have an interface arranged at variable levels for coupling to the autonomous shed vehicle and/or to be designed for level-independent coupling to the autonomous shed vehicle.

A further preferred development is distinguished in that the at least one charging station and/or the at least one fitting station and/or the at least one ballasting station and/or the at least one lock are in the form of a single station and/or combined in a multifunction unit and/or arranged in a shed vehicle supply area.

In farm animal sheds, litter is frequently put out, the level of which differs over the operation of a farm animal shed and/or over different areas of the farm animal shed. In order to ensure that the autonomous shed vehicle and the infrastructure arrangement function reliably, the solutions described in the present case are preferred, which allow independence of a litter level on the floor of an animal residence area.

A raised arrangement can be implemented by means of a raised plateau, for example, which can be achieved for the autonomous shed vehicle by means of a ramp. Preferably, the floor of the plateau can be in the form of a grille, so that litter and/or dirt can fall through the floor of the plateau, so that the level of the plateau is substantially constant.

Arrangement at variable levels and/or coupling independently of level is likewise preferred in order to produce independence in regard to a level of litter and/or other material on the floor of an animal residence area.

A further preferred option consists in making provision for an area shielded entirely or in part from farm animals. In such an area, there is preferably no litter or other material arranged on the floor.

The area shielded from farm animals may be a separate area, for example, that cannot be entered by farm animals, for example, by virtue of there being provision for passage of the autonomous shed vehicle in this area only through a lock with a transit obstacle for farm animals.

By way of example, it may be preferred to arrange a multifunction station and/or a shed vehicle supply area in the area shielded from farm animals. In the area shielded from farm animals, there may also be provision for a floor that cannot be entered by farm animals and/or is entered by farm animals only reluctantly, such as, for example, a cattle grid.

Preferably, the at least one charging station and/or the at least one fitting station and/or the at least one ballasting station and/or the at least one lock may be accessible to the autonomous shed vehicle from different directions and/or may be surrounded entirely or in part by an area shielded from farm animals.

The charging station is preferably designed to allow charging by means of induction. Inductive charging has the advantage that the autonomous shed vehicles can be charged regardless of its physical orientation. Charging can also take place via a charging antenna, the top of which is in contact with an appropriate charging station ("dodgem car principle").

Further, it is preferred for the charging station to be designed in extended fashion and arranged in an area preferably (highly) frequented by the autonomous shed vehicle. By way of example, a charging area may be arranged in an area of the animal residence area in which the autonomous shed vehicle frequently and/or regularly needs to perform work orders, for example, in the area of conveyor belts that need to be cleaned. In this manner, the autonomous shed vehicle can be charged while processing a work order.

In a shed vehicle supply area, in particular, the stations that allow a physical supply to the autonomous shed vehicle, for example, may be combined, such as, for example, the at least one fitting station and/or the at least one ballasting station. By way of example, there may also be provision for a cleaning station in such a shed vehicle supply area. In a multifunction station, in particular, such stations as are used for a virtual supply to the autonomous shed vehicle may preferably be combined, that is to say, in particular, a charging station that preferably also allows a data interface for a contact-based and/or line-based exchange of information between the data transmission unit and the autonomous shed vehicle.

In particular, it may be preferred for the fitting station and the ballasting station and/or the fitting station and the charging station to be in the form of a single station.

Preferably, the exchange of information also comprises information about a status of the autonomous shed vehicle, such as, for example, a battery state of charge and/or a current order list, and/or data from sensors that may be arranged on the autonomous shed vehicle.

Further advantageous variant embodiments of the apparatus described above are obtained by combining the preferred features discussed in the present case.

According to a further aspect of the invention, the object cited at the outset is achieved by a farm animal shed comprising an infrastructure arrangement as described above.

According to a further aspect of the invention, the object cited at the outset is achieved by the use of an infrastructure arrangement as described above in a farm animal shed.

According to a further aspect of the invention, the object cited at the outset is achieved by a method for providing infrastructure for a farm animal shed, comprising determining a position of at least one autonomous shed vehicle by means of an optics-free position determination apparatus of the shed vehicle and a stationary position determination network having multiple optics-free position determination network points, driving the at least one autonomous shed vehicle, charging the at least one autonomous shed vehicle at a charging station, fitting the autonomous shed vehicle with various functional units at a coupling apparatus of the at least one autonomous shed vehicle and/or fitting the autonomous shed vehicle with various work materials, generating a schedule for the autonomous shed vehicle on the basis of information of the position determination apparatus and a data transmission unit in a control unit of the shed vehicle.

The method described above and the preferred developments of said method preferably have features and method steps that make it suitable, in particular, for use for an infrastructure arrangement as described above and the developments thereof.

In regard to the advantages, variant embodiments and embodiment details of these further aspects of the invention and the developments thereof, reference is made to the description above pertaining to the corresponding apparatus features.

BRIEF DESCRIPTION OF THE DRAWINGS

Preferred exemplary embodiments are described in exemplary fashion with reference to the accompanying figures, in which.

DETAILED DESCRIPTION OF THE EMBODIMENTS

In the Figures, elements that are the same or that have essentially the same function are provided with the same reference signs. General descriptions normally relate to all embodiments, unless differences are explicitly indicated.

Figure 1A:
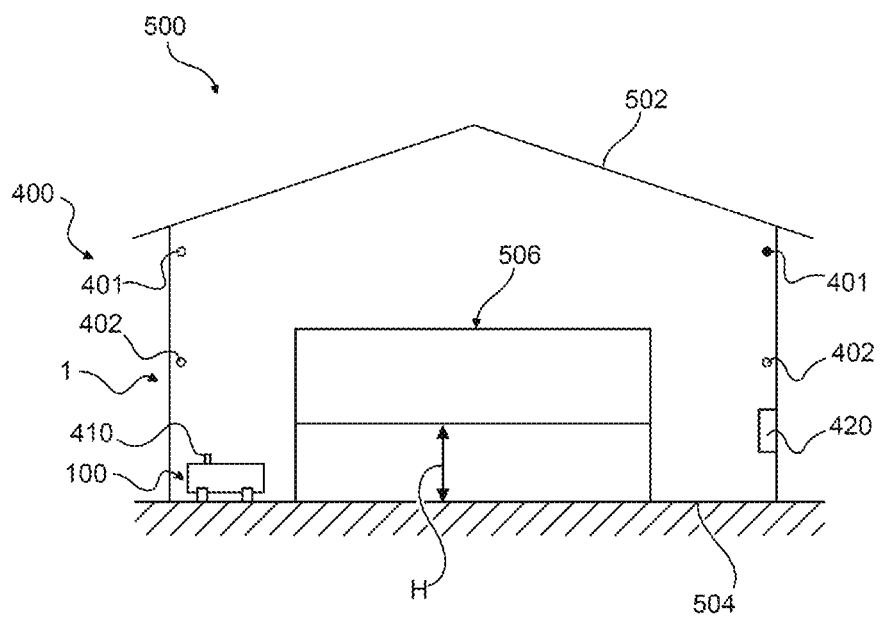
FIG. 1a is a schematic depiction of a farm animal shed with an illustrative embodiment of an infrastructure arrangement.
Figure 1B:
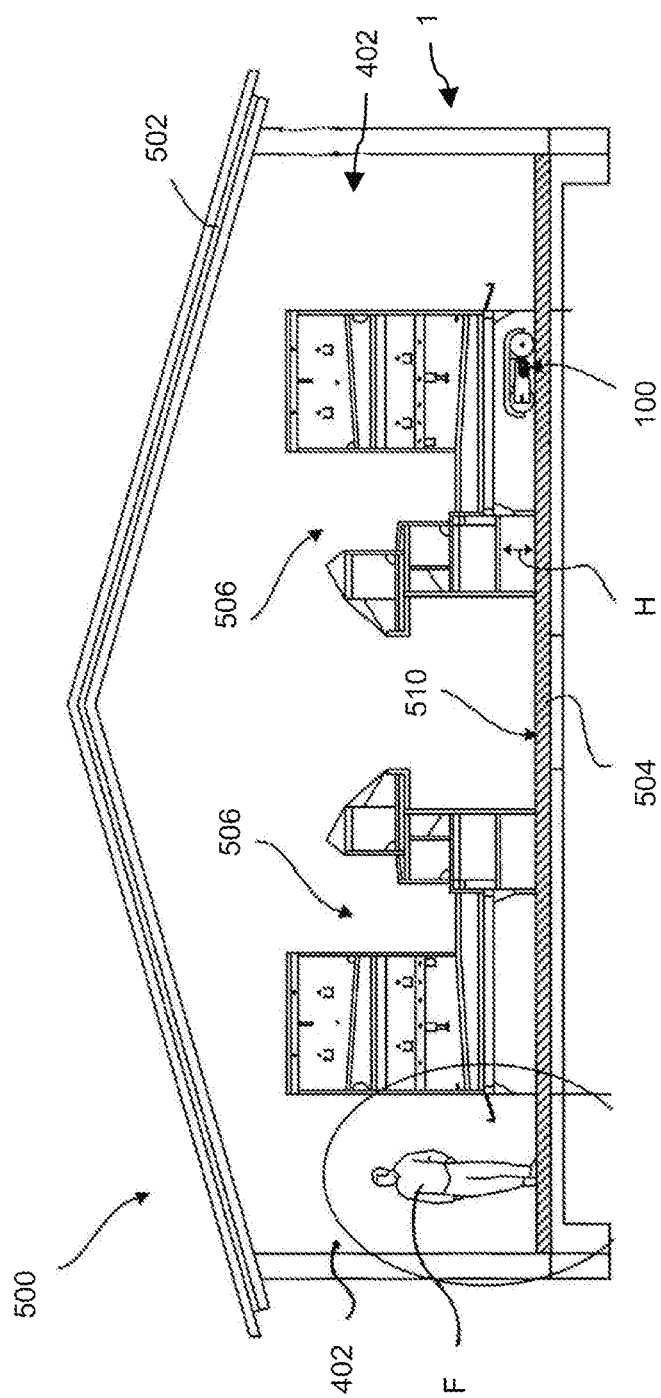
FIG. 1b is a schematic depiction of a farm animal shed with a further illustrative embodiment of an infrastructure arrangement.
Figure 2:
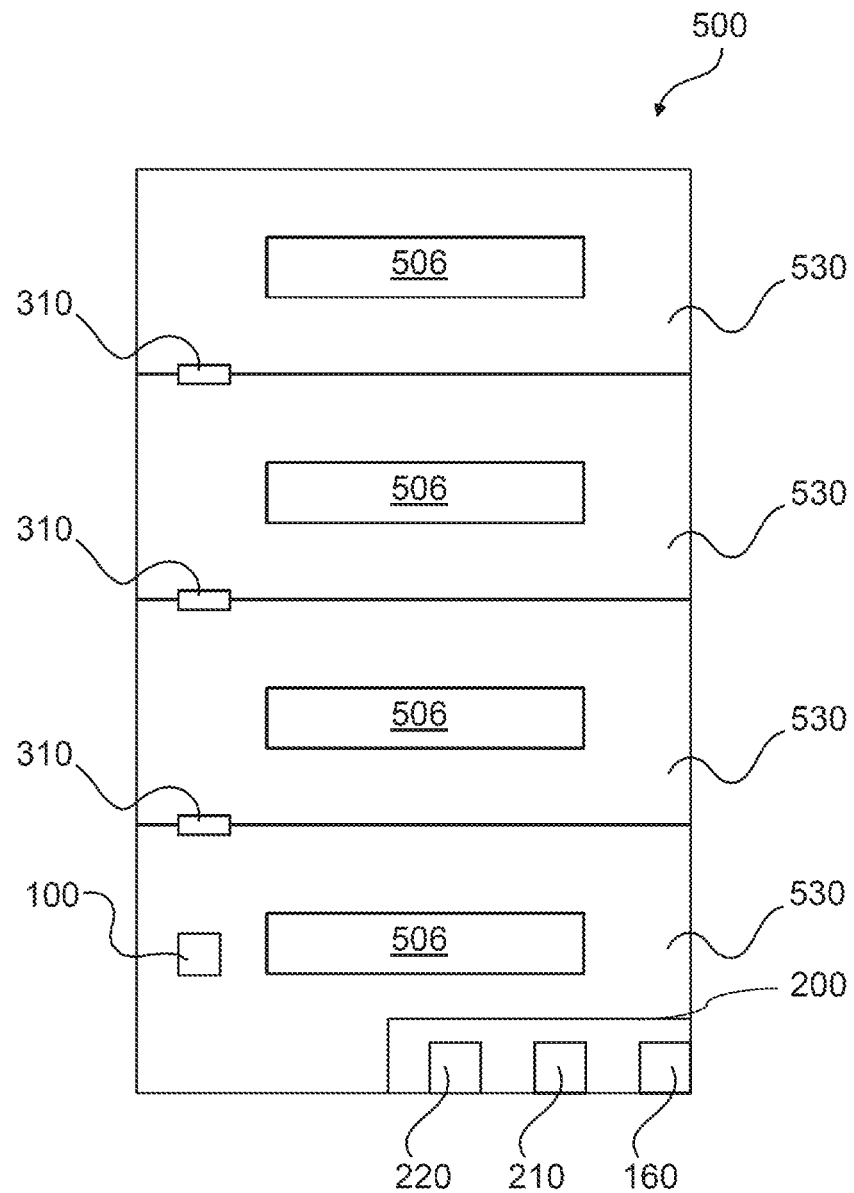
FIG. 2 is a schematic depiction of a farm animal shed with multiple farm animal residence areas.
Figure 3:
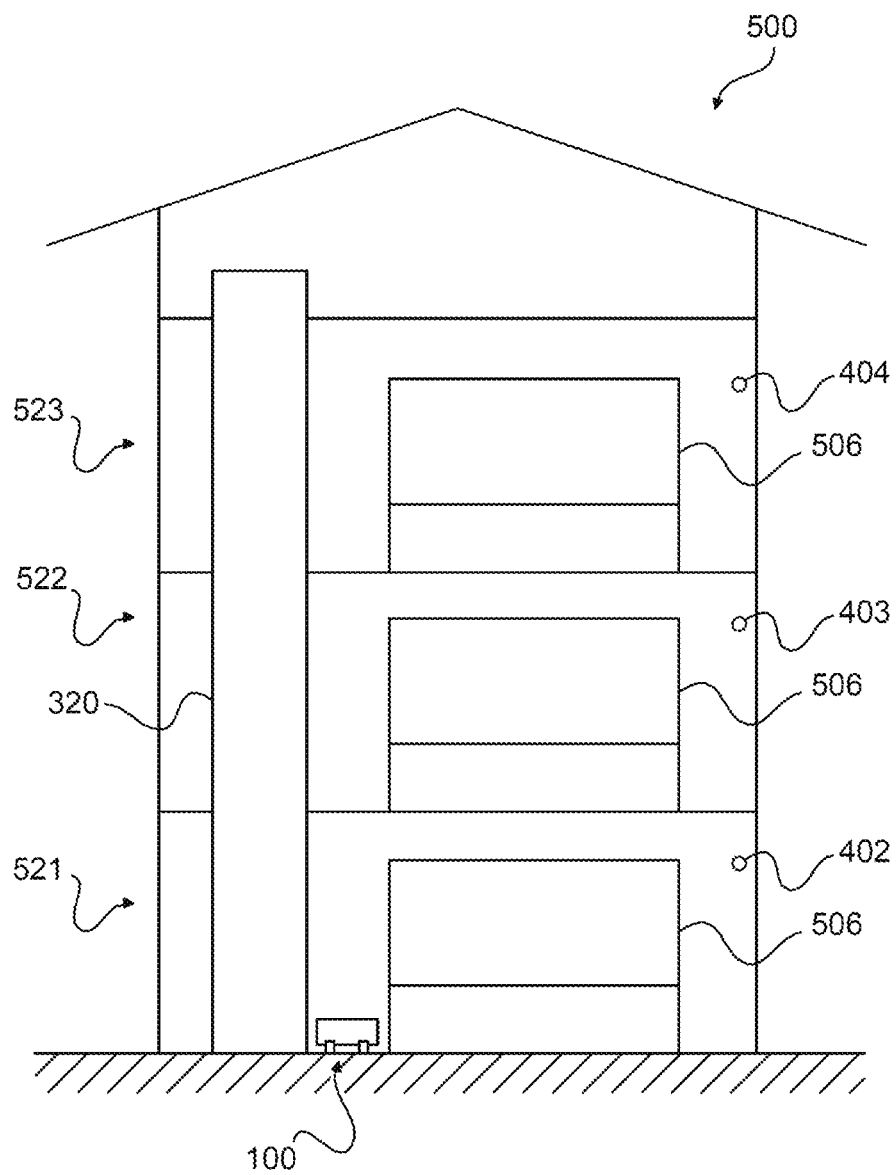
FIG. 3 is a schematic depiction of a further farm animal shed 500 with farm animal residence areas that are arranged above one another in three tiers 521, 522, 523.
Figure 4:
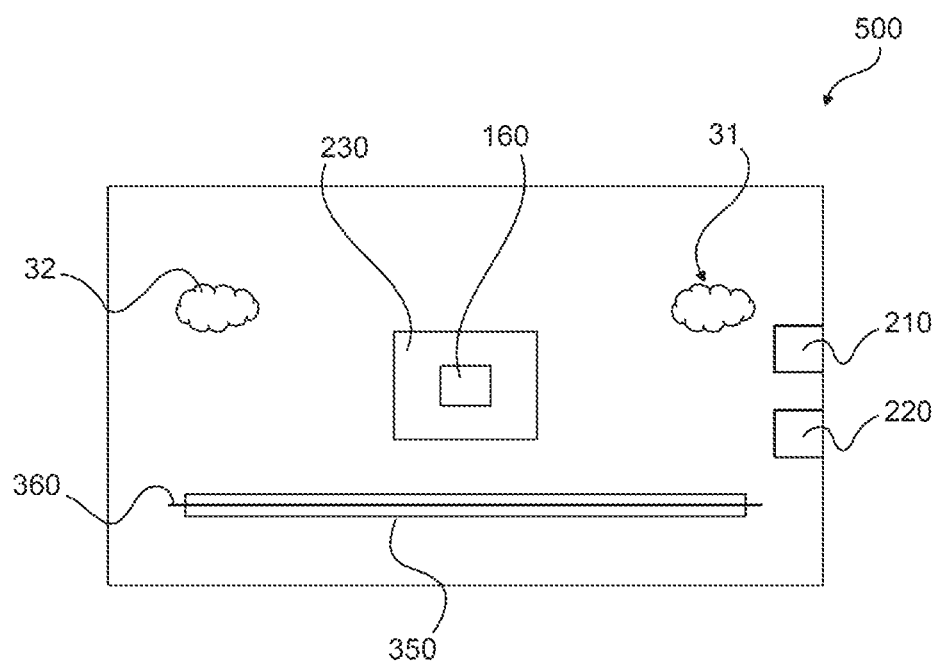
FIG. 4 is a schematic depiction of a plan view of a further farm animal shed with illustrative configurations of charging stations.
Figure 5:
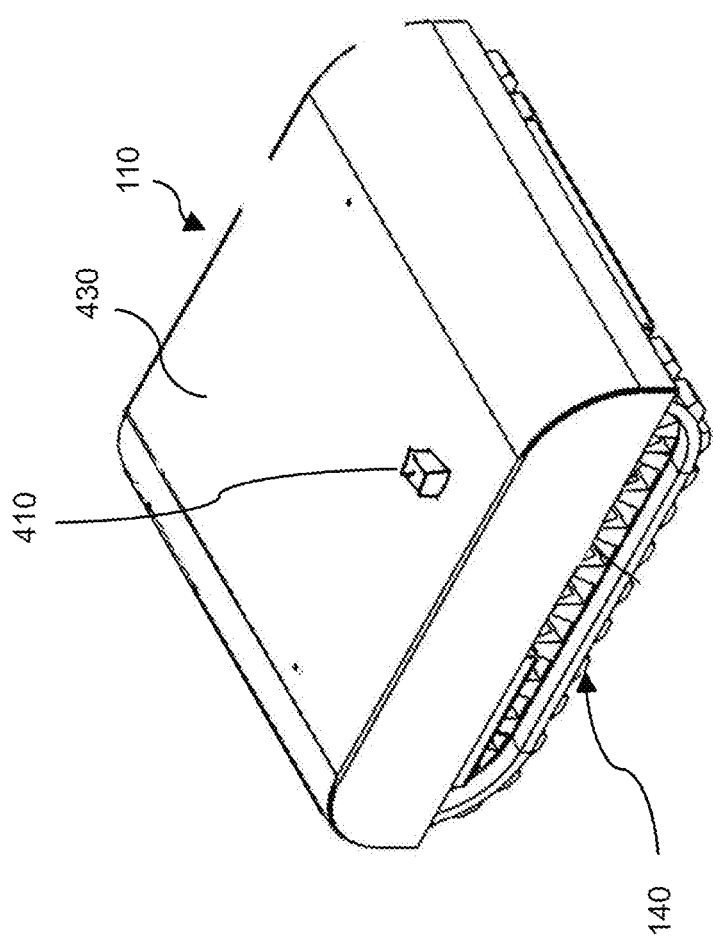
FIG. 5 is a schematic three-dimensional depiction of an illustrative autonomous shed vehicle.
Figure 6:
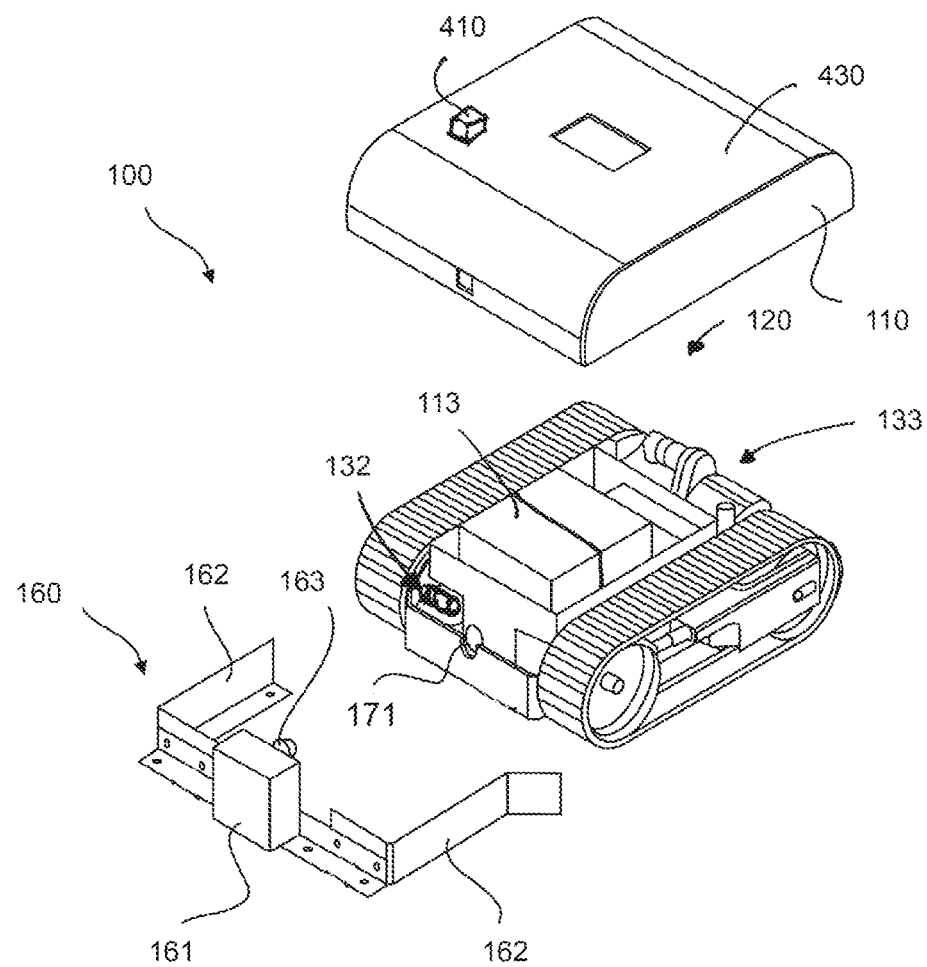
FIG. 6 is a schematic depiction of the shed vehicle shown in FIG. 5 with the housing removed and a charging station.

FIG. 1a shows a schematic depiction of a farm animal shed 500 with an illustrative embodiment of an infrastructure arrangement 1. FIG. 1b also shows a schematic depiction of a farm animal shed 500 with a further illustrative embodiment of an infrastructure arrangement 1. FIG. 2 shows a schematic depiction of a farm animal shed 500 with multiple farm animal residence areas 530. FIG. 3 shows a schematic depiction of a further farm animal shed 500 with farm animal residence areas that are arranged above one another in three tiers 521, 522, 523. FIG. 4 shows a schematic depiction of a plan view of a further farm animal shed 500 with exemplary configurations of charging stations. FIG. 5 shows a schematic three-dimensional depiction of an illustrative autonomous shed vehicle 100. FIG. 6 shows a schematic depiction of the shed vehicle 100 shown in FIG. 5 with the housing removed and a charging station.

The description that follows relates essentially to all of the embodiments depicted in the present case, unless differences are explicitly indicated.

The infrastructure arrangement 1 for a farm animal shed 500 comprises a stationary position determination network 400 having multiple optics-free position determination network points 401, 402, 403, 404. The position determination network 400 comprises a multiplicity of position determination network points, of which only individual position determination network points 401, 402, 403, 404 are representatively depicted in the figures. As can be seen in FIG. 1a, in particular, the position determination network points 401 are situated on a first horizontal level and the position determination network points 402 are situated on a second horizontal level. Whereas the position determination network points 401 are arranged close to the shed roof 502, the position determination network points 402 are arranged below an upper end of the shed fixtures 506 and at the same time above a clear height H of the shed fixtures 506. In the multitier configuration of the farm animal shed 500 shown in FIG. 3 too, there is preferably provision on each tier 521, 522, 523 for position determination network points 402, 403, 404 that are each arranged above a clear height of the shed fixtures 506 and below an upper end of the shed fixtures 506. The arrangement of the position determination network points 402 is preferred over an arrangement of position determination network points 401. Position determination network points 401 close to the shed roof can preferably be dispensed with.

The optics-free position determination apparatus 410 and the optics-free position determination network 400 have the advantage of reliable position determination in the farm animal shed 500, wherein a, preferably electronic, map of a farm animal shed 500 can more preferably be validated and/or corrected and/or improved during operation and/or during startup.

This clear height H preferably corresponds substantially to a height that is slightly greater than a head height of farm animals on the shed floor 503, so that said farm animals can move beneath the shed fixtures 506.

The infrastructure arrangement 1 comprises an autonomous shed vehicle 100 that has a drive 132 for driving the tracked chassis 140 and a charging interface in the form of a charging opening 171. The charging opening 171 can be coupled to side walls 162 via the charging pin 163 of the charging base 161 of a charging station 160, in order to charge the drive 132.

The shed vehicle 100 is further equipped with a coupling apparatus 133 for detachably securing various functional units, such as, for example, a till.

The shed vehicle 100 has a housing 110 and a base body or chassis 120. The shed vehicle 100 further has a position determination apparatus 410 arranged on it and also a control unit 113.

The control unit 113 of the autonomous shed vehicle 100 is designed to take information of the position determination apparatus 410 and of a data transmission unit 420 (see FIG. 1a) as a basis for generating a schedule for the autonomous shed vehicle 100.

By way of example, a user F may have used a central computer to load information about work orders, which is made available to the shed vehicle 100 via the data transmission unit 420 in order to generate a schedule. The work orders can relate for example to putting out manipulable material in an area B1 and tilling hard litter in an area B2. In this instance, the schedule can provide for a sequence and/or a length of stay in the work areas B1 and/or B2, for example. The user F can input the work orders via a human-machine interface and/or via a mobile terminal, for example.

The appearance of the schedule of the autonomous shed vehicle 100 could thus be to travel to a fitting station 210 first of all and to pick up manipulable material there. The schedule can provide for the autonomous shed vehicle 100 to subsequently travel to the area B1, in order to put out the manipulable material there. Subsequently, the autonomous shed vehicle 100 can, according to the schedule, return to the fitting station 210 and couple itself to a till as a functional unit. If need be, it may be preferred for additional ballast to be picked up for the tilling in a ballasting station 220. The schedule can subsequently provide for the shed vehicle 100 to travel to the area B2 in order to till hard litter there. Subsequently, the schedule can provide for the autonomous shed vehicle 100 to deliver the additional ballast to the ballasting station 220 again and/or to decouple the till at the fitting station 210 again.

Subsequently, the autonomous shed vehicle can undertake a recurring task, for example, such as cleaning conveyor belts 350, for example. Preferably, there may be provision for an elongate charging station 360 in this area, so that the shed vehicle can preferably be charged while the conveyor belt 350 is being cleaned. An elongate charging station 360 may be designed for inductive charging, for example, or may comprise a conductor, arranged above the shed vehicle, that the shed vehicle 100 couples to for the purpose of charging with a charging antenna.

Alternatively, or additionally, there may be provision for a charging station 160 surrounded by an area 230 that is shielded from farm animals, for example, in the form of a cattle grid. Alternatively, or additionally, the charging station 160 may also be arranged on a raised plateau via a ramp, in order to equalize a different level of litter or to be independent thereof.

As can be seen in FIG. 2, in particular, the charging station 160, the fitting station 210 and the ballasting station 220 may be combined in a shed vehicle supply area 200.

Further, FIG. 2 reveals multiple farm animal residence areas 530 that are arranged on one level and that each have shed fixtures 506 arranged in them. The farm animal residence areas 530 are connected via locks 310 that permit passage of the shed vehicle 100 and preferably prevent farm animals from passing.

In the example of a farm animal shed 500 that is depicted in FIG. 3, the farm animal residence areas are arranged on multiple levels 521, 522, 523 that are connected via a lift unit 320. The shed vehicle 100 can work on all three levels 521, 522, 523 by means of the lift unit 320.

In the locks 310 and/or the lift unit 320, there is preferably provision for cleaning apparatuses for cleaning and/or disinfecting the autonomous shed vehicle 100 or parts thereof. More preferably, the locks 310 and/or the lift unit 320 can also comprise a charging station for charging the drive of the autonomous shed vehicle 100 and/or a data interface for coupling to the data transmission unit 420. The lift unit 320 also preferably comprises a transit obstacle for farm animals, so that the farm animals are prevented from changing between the tiers 521, 522, 523.

Preferably, there is provision in the locks 310 and/or in the charging stations 160, 360 and/or in the fitting station 210 and/or in the ballasting station 220 for data interfaces by means of which the autonomous shed vehicle 100, in particular, its control unit 113, can communicate with the data transmission unit 420 preferably in contact-based and/or line-based fashion in order to download new work orders and/or to upload collected data, for example.

The shed vehicle 100 can also follow a user F at a distance in a butler function. Items to be transported can be deposited on a tray apparatus 430 of the autonomous shed vehicle 100 and transported by the shed vehicle.

The arrangement of an infrastructure unit 1 as described in the present case in a farm animal shed 500 allows a large amount of required work to be performed in a simple and inexpensive manner. This allows a large amount of work to be performed even when there is a shortage of personnel, for example, which promotes animal welfare. At the same time, the infrastructure arrangement allows many measures to be performed quickly and inexpensively, increasing the efficiency of farm animal husbandry.

The invention claimed is:

1. An infrastructure arrangement for a farm animal shed comprising:
    a stationary position determination network having multiple optics-free position determination network points;

at least one autonomous shed vehicle, wherein the autonomous shed vehicle comprises:
a drive and a charging interface for the drive;
an optics-free position determination apparatus;
a coupling apparatus for detachably securing various functional units; and
a control unit;
at least one charging station for charging the drive of the autonomous shed vehicle;
at least one fitting station for fitting the autonomous shed vehicle with various functional units or work materials; and
at least one data transmission unit;
wherein the control unit of the autonomous shed vehicle is adapted to take information of the position determination apparatus and of the data transmission unit as a basis for generating a schedule for the autonomous shed vehicle; and
wherein the infrastructure arrangement comprises at least one lock disposed between two or more farm animal residence areas wherein the at least one lock is adapted for passage of the autonomous shed vehicle, and the at least one lock comprises a transit obstacle for farm animals.

2. The infrastructure arrangement pursuant to claim 1, wherein the optics-free position determination apparatus is adapted to communicate with the position determination network to determine a position of the autonomous shed vehicle inside the farm animal shed.

3. The infrastructure arrangement pursuant to claim 1, wherein the position determination apparatus, the at least one of the position determination network points, or the position determination network comprises an ultrawideband unit, an RFID unit, a radio unit, an odometer, an inertial sensor system, or a radar sensor system.

4. The infrastructure arrangement pursuant to claim 1, wherein a distance in the vertical direction between at least one of the position determination network points or the position determination network and the optics-free position determination apparatus of the autonomous shed vehicle is less than ten times an extent in the vertical direction of the autonomous shed vehicle or is less than 3 m.

5. The infrastructure arrangement pursuant to claim 1, wherein the drive of the at least one autonomous shed vehicle is a substantially emission-free drive.

6. The infrastructure arrangement pursuant to claim 5, wherein the drive of the at least one autonomous shed vehicle is an electric drive.

7. The infrastructure arrangement pursuant to claim 1, further comprising at least one ballasting station for arranging additional weights on the autonomous shed vehicle.

8. The infrastructure arrangement pursuant to claim 1, wherein the schedule comprises a sequence, a length of stay for traveling to a work area, or length of staying at the work area.

9. The infrastructure arrangement pursuant to claim 1, wherein:
the data transmission unit comprises a human-machine interface or a data interface adapted to obtain information about tasks to be performed by the autonomous shed vehicle or to convey information about tasks performed by the autonomous shed vehicle; or
the data transmission unit and the control unit of the autonomous shed vehicle are adapted for contact-based or line-based exchange of information with one another.

10. The infrastructure arrangement pursuant to claim 1, wherein the control unit of the autonomous shed vehicle is adapted to receive a callback order from the data transmission unit in non-contact-based or non-line-based fashion or to convey position or status information to the data transmission unit in non-contact-based or non-line-based fashion.

11. The infrastructure arrangement pursuant to claim 1, wherein the control unit is designed to have the autonomous shed vehicle follow a user at a distance.

12. The infrastructure arrangement pursuant to claim 1, wherein the autonomous shed vehicle comprises a tray apparatus for holding items to be transported.

13. The infrastructure arrangement pursuant to claim 1, wherein the at least one lock comprises:
a lift unit for moving the autonomous shed vehicle in the vertical direction;
a cleaning apparatus for cleaning or disinfecting the autonomous shed vehicle or parts thereof;
a charging station for charging the drive of the autonomous shed vehicle; or
a data interface for coupling to the data transmission unit.

14. The infrastructure arrangement pursuant to claim 1, wherein the at least one charging station, the at least one fitting station, at least one ballasting station, or the at least one lock disposed between two or more farm animal residence areas is disposed at a higher level than a floor of a one of the two or more farm animal residence areas or is disposed entirely or partly in an area shielded from farm animals.

15. The infrastructure arrangement pursuant to claim 1, wherein the at least one charging station, the at least one fitting station, at least one ballasting station, or the at least one lock disposed between two or more farm animal residence areas is arranged at variable levels or has an interface arranged at variable levels for coupling to the autonomous shed vehicle or is adapted for level-independent coupling to the autonomous shed vehicle.

16. The infrastructure arrangement pursuant to claim 1, wherein the at least one charging station, the at least one fitting station, at least one ballasting station, or the at least one lock disposed between two or more farm animal residence areas is in the form of a single station, combined in a multifunction unit, or arranged in a shed vehicle supply area.

17. A farm animal shed comprising an infrastructure arrangement according to claim 1.

18. The use of an infrastructure arrangement comprising:
a stationary position determination network having multiple optics-free position determination network points;
at least one autonomous shed vehicle, wherein the autonomous shed vehicle comprises:
a drive and a charging interface for the drive;
an optics-free position determination apparatus;
a coupling apparatus for detachably securing various functional units; and
a control unit;
at least one charging station for charging the drive of the autonomous shed vehicle;
at least one fitting station for fitting the autonomous shed vehicle with various functional units or work materials; and
at least one data transmission unit;
wherein the control unit of the autonomous shed vehicle is adapted to take information of the position determination apparatus and of the data transmission unit as a basis for generating a schedule for the autonomous shed vehicle; and wherein the infrastructure arrangement comprises two or more farm animal residence areas and the infrastructure arrangement further comprises at least one lock disposed between the two or more farm animal residence areas, wherein the at least one lock is designed for passage of the autonomous shed vehicle, and the at least one lock comprises a transit obstacle for farm animals.

19. A method for providing infrastructure for a farm animal shed comprising the steps of:

determining a position of at least one autonomous shed vehicle by means of an optics-free position determination apparatus of the at least one autonomous shed vehicle and a stationary position determination network having multiple optics-free position determination network points;

driving the at least one autonomous shed vehicle;

charging the at least one autonomous shed vehicle at a charging station;

fitting the autonomous shed vehicle with various functional units at a coupling apparatus of the at least one autonomous shed vehicle or fitting the autonomous shed vehicle with various work materials;

generating a schedule for the autonomous shed vehicle on the basis of information of the position determination apparatus and a data transmission unit in a control unit of the at least one autonomous shed vehicle;

providing at least one lock disposed for arrangement between two or more farm animal residence areas, wherein the at least one lock is designed for passage of the autonomous shed vehicle and the at least one lock comprises a transit obstacle for farm animals.

\* \* \* \* \*